United States Patent Office 3,437,688
Patented Apr. 8, 1969

3,437,688
PREPARATION OF LOWER FATTY ACID ESTERS OF CARBORANE ALCOHOLS
Nelson N. Schwartz, Trenton, N.J., assignor to Thiokol Chemical Corporation, Bristol, Pa., a corporation of Delaware
No Drawing. Continuation-in-part of application Ser. No. 844,821, Oct. 2, 1959. This application June 1, 1965, Ser. No. 460,495
Int. Cl. C07c 67/00, 69/00; C07d 107/02
U.S. Cl. 260—491        14 Claims

ABSTRACT OF THE DISCLOSURE

A method has been provided for making a lower fatty acid monoester or diester of a carborane alcohol or diol, respectively, which comprises reacting a coordination compound of decaborane and a nitrogen-containing compound selected from the group consisting of primary and secondary amines and diamines, nitriles and dinitriles with a lower fatty acid monoester or diester of an acetylenically unsaturated alcohol or diol, whereby decaborane is added to the triple bond of said monoester or diester.

---

This application is a continuation-in-part of Ser. No. 844,821, filed Oct. 2, 1959, now abandoned, and Ser. No. 64,212, filed Oct. 21, 1960, now abandoned, both applications in the name of Nelson N. Schwartz.

This invention concerns novel organoboron compositions and a process for preparing them.

More particularly, this invention relates to mono and diesters of carborane alcohols and carborane diols. These esters are useful as polymer precursors and as propellant fuel.

The terms "carborane alcohols" and "carborane diols" as used throughout this application are used to describe compounds containing one carborane group as well as one or two hydroxy groups.

"Carborane" is the generic term used to describe all the isomers of the dicarbaclovododecaborane of the empirical formula: $B_{10}C_2H_{12}$.

The term "carboranyl" is the name given to the radical of the ortho carborane isomer shown below:

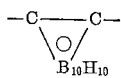

The ortho isomer is also referred to by the Greek letter theta, abbreviated as $\theta$.

It is an object of this invention, among others, to prepare monomers useful for introducing the carborane nucleus into organic structures.

It is an additional object to prepare intermediates for preparing carborane polymers.

It is another object of the invention to prepare carborane monomers useful as fuel additives.

Additional objects will become apparent after a further reading of this application.

The above objects are achieved by contacting an acetylenic mono or diester preferably with a nitrilodecaborane reactant selected from the group consisting of bis(alkylnitrilo)decaborane nad bis-6,9-(alkylnitrilo)alkyldecaborane until the carborane nucleus is taken up at the site of the triple bond(s), hydrogen is evolved, and acetonitrile is prepared as a by-product. Alternatively, the acetylenic ester can be reacted either with the components of the nitrilodecaborane reactant, "bis(acetonitrile)" and decaborane (or alkyldecaborane), to form the nitrilodecaborane in situ. Less preferably, various Lewis bases can be used in place of the bis(acetonitrile) component. In this less favored alternative method, a variety of ethers, other nitriles, sulfides, phosphines or amines can be used in place of acetonitrile. These include diethyl sulfide, di-n-propyl sulfide, tetrahydrofuran, diethyl ether, n-butyl methyl sulfide, di-n-butyl ether, di-n-propyl ether, triethylamine, N, N-dimethylacetamide, N,N-dimethylformamide, tributylphosphine, dimethylcyanamide or any other type of Lewis base having the requisite solubility and boiling point. In any event, the carborane mono or diester is customarily isolated and purified by filtering the reaction mixture, stripping off the volatiles including solvent from the filtrate and concentrating the filtrate to product under vacuum. However, other purification procedures such as recrystallization, chromatography, etc. can be used where desired.

In practice, an acetylenic ester or diester derived from the reaction of a saturated monocarboxylic or unsaturated monocarboxylic acid (or the corresponding acid anhydride or acid halide) with an acetylenic alcohol or diol at a temperature ranging from about 50 to 250° C., is contacted with the afore-mentioned nitrilodecaborane reactant, at atmospheric or superatmospheric pressures, until hydrogen is evolved, and the carborane ester product and acetonitrile by-product is formed.

In the preferred practice, an acetylenic mono or diester wherein the ester group is derived from an acid which has from 1 to 6 carbon atoms is contacted with bis(acetonitrilo)decaborane at atmospheric pressure, in the presence of a solvent refluxing between about 75 to 175° C. until the desired carborane mono or diester is formed. Ordinarily, substantial quantities of the product are formed between about ½ hour to 24 hours or more dependent upon the particular reactants employed, the ratio of the reactants, the reaction temperatures and pressures and the like.

The inventive process is advantageous because of the novelty and utility of the products, the availability of the reactants and the flexibility of the reaction conditions.

The ratio of reactants can be varied widely, generally being in the ratio of 1 to 3 moles of the bis-6,9-(alkylnitrilo)decaborane or bis-6,9-(alkylnitrilo)alkyldecaborane reactant per mole of the acetylenic ester reactant and preferably in the range of 1 to 1.5 moles of the bis-6,9-(alkylnitrilo)decaborane or bis-6,9-(alkylnitrilo)alkyldecaborane reactant per mole of acetylenic ester reactant. Comparable ratios of the decaborane-Lewis base complex to acetylenic ester are used when other Lewis bases are substituted for the acetonitriles.

The amount of inert solvent employed is not critical but usually an excess of solvent, up to 5–15 times the weight of the reactants, is employed. Suitable aromatic solvents include benzene, toluene, the xylenes and halogenated aromatics generally.

The decaboranes and alkyl decaboranes are known compounds and are extensively documented in the chemical and patent literature. The nitrilodecaboranes which are also extensively reported on are prepared by reacting a lower alkyl decaborane with from 1 to 15 moles, per mole of lower alkyl decaborane, of an alkyl cyanide containing from 1 to 4 carbon atoms in the alkyl radical at a temperature of about 50° to 100° C.

Suitable bis-6,9-(alkylnitrilo)decaboranes and bis-6,9-(alkylnitrilo)alkyldecaboranes which can be used as reactants in the inventive process include the following: bis-6,9-(methylnitrilo)decaborane more commonly known as bis(acetonitrilo)decaborane, bis-6,9-(methylnitrilo) methyldecaborane, bis - 6,9 - (methylnitrilo)ethyldecaborane, bis-6,9-(methylnitrilo)diethyldecaborane, bis-6,9-(propionitrilo)methyldecaborane, bis - 6,9 - (n - propionitrilo)decaborane, bis-6,9-(n-valeronitrilo)decaborane, bis-6,9-(n-capronitrilo)decaborane, bis-6,9-(isobutyronitrilo) decaborane, bis-6,9 - (isovaleronitrilo)methyldecaborane, bis-6,9-(isobutyronitrilo)ethyldecaborane, bis-6,9 - (methylnitrilo)n-propyldecaborane and the like.

Suitable acetylenic ester reactants are produced by reacting a monocarboxylic acid (preferably having from 1 to 6 carbon atoms) or the corresponding monocarboxylic acid chloride or anhydride with an acetylenic monohydric or dihydric alcohol containing from 1 to 10 carbon atoms at elevated temperatures in the presence of a catalytic quantity (generally about 0.01 to 5% by weight) of an esterification catalyst. Suitable esterification catalysts include sulfuric acid, benzene sulfonic acid, toluene sulfonic acid and the like. The esters can be prepared from acids such as formic acid, acetic acid, acrylic acid, methacrylic acid, propionic acid, n-butyric acid, valeric acid, benzoic acid, and the like, and alcohols such as propargyl alcohol, 3-butyn-1-ol, 3-butyn-2-ol, 1-pentyn-5-ol, 1-pentyn-4-ol, 3-hexyn-1-ol, butyndiol-1,4; 2-hexyndiol-1,6; 3-hexyndiol-1,6; 1-octyn-8-ol, 1-decyn-10-ol, and the like among many others. Illustrations of the acetylenic ester reactants include the following esters which, in some instances, are indicated by structure rather than by name: propargyl acetate, propargyl acrylate, propargyl butyrate, 3-butyn-1-yl acetate, 3-butyn-2-yl acetate, 1-pentyn-5-yl acetate, 1-pentyn-4-yl propionate, butyndiyl-1-4-diacetate, butyndiyl-1,4-dibenzoate, 2-hexyndiyl - 1,6 - diacetate, 1-heptyn-7-yl-valerate, 1-nonyn-9-yl-propionate $$HC{\equiv}CCH(CH_3)OCOHC{=}CH_2$$

$HC{\equiv}CCH_2OCOC_2H_5$, $HC{\equiv}C(CH_2)_6OCOCH_3$ and the like.

The above reactants are definite and distinct chemical compositions well documented in the recent chemical literature. Structures, data and characteristics of the first member of the series, bis-6,9-(acetonitrilo)-decaboranes, have been published in JACS, 79, 1006–7 (1957), JACS, 80, 6695 (1958), Anal. Chem., 32, 796–9 (1960) and JACS, 81, 5519 (1959) among other places.

The inventive process and the products produced therein are best illustrated by the detailed embodiments which follow:

In one embodiment of this invention, a mixture of 5.9 grams (0.029 moles) of bis-6,9-(acetonitrilo)decaborane and 5.9 grams of 1,4-diacetoxy-2-butyne and 5.9 ml of toluene are heated at reflux for 2 hours. The mixture is cooled and filtered. Concentration of the filtrate in vacuo yields 8 grams of an orange colored oil. Infrared analysis of the product confirms that the product has the structure:

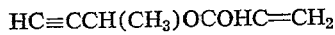

In another embodiment, a reaction mixture of 31 grams weight of bis-6,9-(acetonitrilo)decaborane (0.15 mole) and 17 grams propargyl acrylate $$(HC{\equiv}CCH_2OCOCH{=}CH_2)$$

and 250 ml. of benzene are heated at 80° C. for about 20 hours. At the end of this time, the reaction is stopped, cooled and filtered. The filtrate is fractionated in vacuo to yield 4.5 grams of a product having a boiling point of 98–100° C./0.2 mm., $n_d^{2-5}$ 1.5390. Infrared analysis confirms the formula of the product to be:

$$H\theta CH_2OCOCH{=}CH_2$$

In a further embodimnet, a reaction mixture of 8.5 grams of bis-6,9-(acetonitrilo)decaborane, 6.5 grams of $CH_3C{\equiv}CCH{=}CH{-}HC(OCOCH_3)CH_3$ and 100 ml. of benzene are heated at 80° C. for 5 hours. A dark mixture is obtained which is cooled and filtered. The filtrate is evaporated in vacuo to give 5.5 grams of crude product. This, upon further purification, yields a purified ester which infrared analysis indicates is:

$$CH_3\theta CH{\equiv}CHCH(OCOCH_3)(CH_3)$$

In a further embodiment, a reaction mixture of equimolar quantities of $HC{\equiv}CCH_2CH_2OCOCH_3$ and bis-6,9-(acetonitrilo)decaborane and excess xylene are refluxed for 24 hours. At the end of this time, the reaction mixture is cooled and filtered. The filtrate is evaporated down in vacuo to give a product which, upon further purification, is shown to melt at 59° C. and has the formula: $H\theta CH_2CH_2OCOCH_3$.

In still another embodiment, a reaction mixture of equimolar quantities by weight of $$HC{\equiv}CHCH(CH_3)OCOCH_3$$

and bis-6,9-(acetonitrilo)decaborane and excess toluene are refluxed for 24 hours then cooled and filtered. The filtrate is concentrated and fractionated under vacuum to produce a product which infrared analysis establishes has the formula: $H\theta CH(CH_3)OCOCH_3$.

In yet a further embodiment, equimolar quantities of propargylmethacrylate $$(HC{\equiv}C{-}CH_2OCO(CH_3)C{=}CH_2)$$

and bis-6,9-(acetonitrilo)decaborane in excess benzene are refluxed for 24 hours to form a reaction mixture including product. After filtration and removal of the volatiles from the filtrate, vacuum distillation of the product yields a composition which infrared analysis indicates has the formula:

$$H\theta CH_2OCO(CH_3)C{=}CH_2$$

In an additional embodiment, equimolar portions of propargyl acetate $(HC{\equiv}CCH_2OCOCH_3)$ and bis-6,9-(acetonitrilo)decaborane and excess toluene are refluxed for 24 hours to produce a reaction mixture including product. After cooling and filtering, the filtrate is freed of volatiles and vacuum distilled to a product which analysis indicates to be: $H\theta CH_2OCOCH_3$.

The organoboron products prepared in accordance with the method of this invention, when incorporated with suitable oxidizers such as ammonium perchlorate, potassium perchlorate, sodium perchlorate, ammonium nitrate and the like, and polymeric binders such as the polyurethanes, polyacrylates, etc. yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods above, when ignited by conventional means, such as a pyrotechnic type igniter, are mechanically strong enough to withstand ordinary handling, and exhibit good specific impulses.

As indicated by the prior disclosure embodiments presented supra, numerous modifications and changes can be made in reactants, reaction conditions and the like without departing from the inventive concept. The metes and bounds of this invention are best indicated by the claims which follow.

I claim:
1. A method for the production of a carborane mono or diester which comprises reacting a bis-6,9-(lower alkylnitrilo)decaborane with an acetylenic compound which is an ester of a fatty acid having from 1 to 6 carbon atoms and an acetylenic alcohol selected from the class consisting of monohydric and dihydric alcohols containing from 3 to 10 carbon atoms while the reactants are in admixture with an aromatic hydrocarbon solvent, the bis-6,9-(lower alkylnitrilo)decaborane being a reaction product of decaborane with an alkyl nitrile having from 1 to 6 carbon atoms.

2. The method of claim 1 wherein the nitrilodecaborane is bis-6,9-(acetonitrilo)decaborane.

3. The method of claim 1 wherein the acetylenic compound is 1,4-diacetoxy-2-butyne.

4. The method of claim 1 wherein the acetylenic compound is $HC{\equiv}CCH_2CH_2OCOCH_3$.

5. The method of claim 1 wherein the acetylenic compound is HC≡CCH$_2$OCOCH$_3$.

6. The method of claim 1 wherein the acetylenic compound is HC≡CCH(CH$_3$)OCOCH$_3$.

7. The method of claim 1 wherein the aromatic hydrocarbon solvent is toluene.

8. The method of claim 1 wherein the nitrilodecaborane is bis-6,9(acetonitrilo)decaborane, and the acetylenic compound is 1,4-diacetoxy-2-butyne.

9. The method of claim 1 wherein the nitrilodecaborane is bis-6,9(acetonitrilo)decaborane, and the acetylenic compound is HC≡CCH$_2$CH$_2$OCOCH$_3$.

10. The method of claim 1 wherein the nitrilodecaborane is bis-6,9(acetonitrilo)decaborane, and the acetylenic compound is HC≡CCH$_2$OCOCH$_3$.

11. The method of claim 1 wherein the nitrilodecaborane is bis-6,9(acetonitrilo)decaborane, and the acetylenic compound is HC≡CCH(CH$_3$)OCOCH$_3$.

12. A method of making a lower fatty acid diester of a carborane diol which comprises reacting a coordination compound of decaborane and a nitrogen-containing compound selected from the group consisting of primary and secondary amines and diamines, nitriles and dinitriles with a lower fatty acid diester of an acetlyenically unsaturated diol, whereby decaborane is added to the triple bond of said diester.

13. A method as in claim 12 wherein said coordination compound is bis(acetonitrile)decaborane.

14. A method as in claim 12 wherein said acetylenically unsaturated diol is 2-butynediol-1,4.

References Cited

UNITED STATES PATENTS

| 3,135,786 | 6/1964 | Ager et al. | 260—488 |
| 3,166,597 | 1/1965 | Ager et al. | 260—488 |
| 3,167,590 | 11/1959 | Heying | 260—488 |
| 3,203,979 | 8/1965 | Ager et al. | 260—488 |

LORRAINE A. WEINBERGER, *Primary Examiner.*

VIVIAN GARNER, *Assistant Examiner.*

U.S. Cl. X.R.

260—488, 486, 476